July 25, 1933.  J. ADERER  1,919,762
ORTHODONTIC APPLIANCE
Filed Sept. 2, 1931
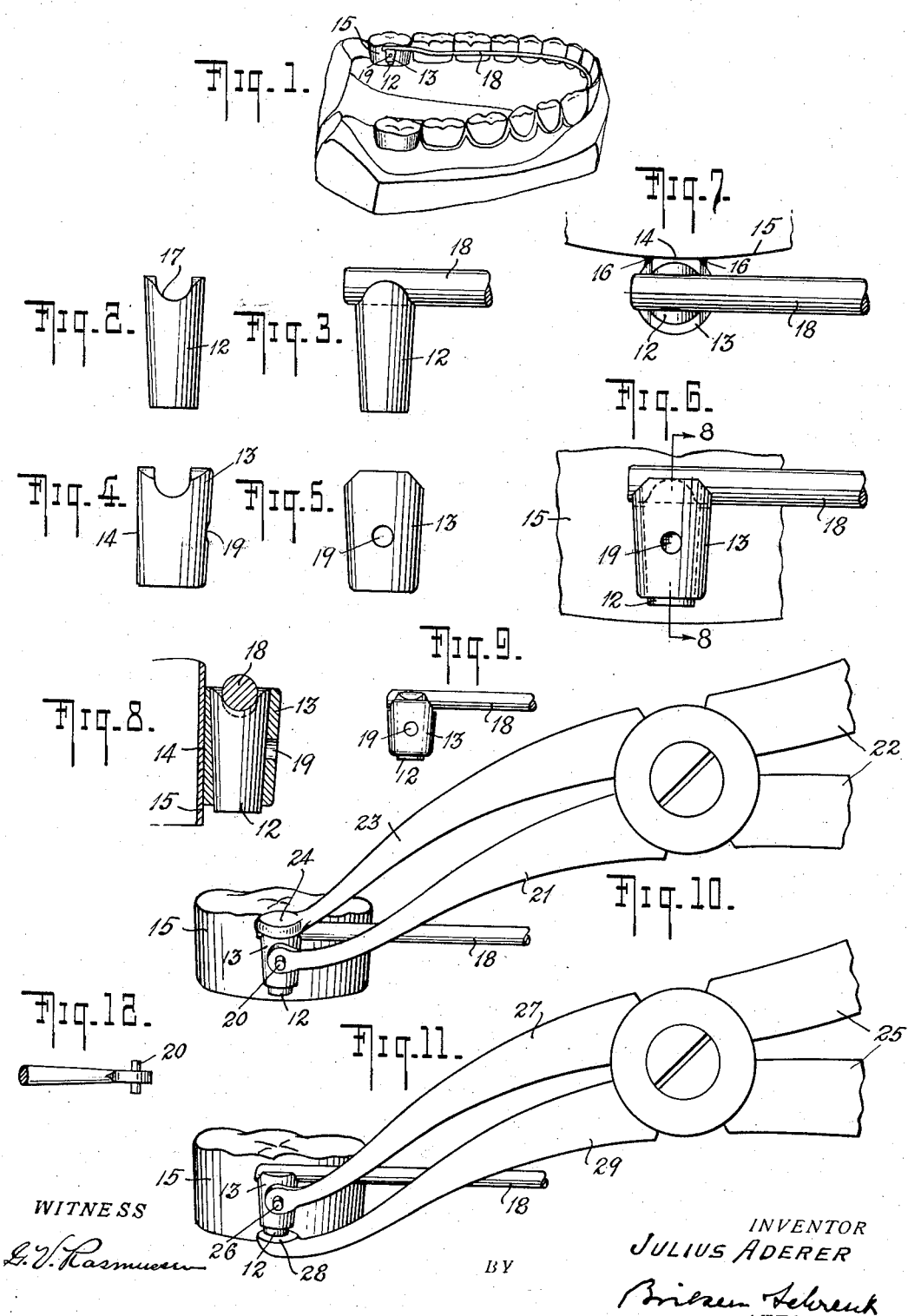
INVENTOR
JULIUS ADERER Patented July 25, 1933

1,919,762

UNITED STATES PATENT OFFICE

JULIUS ADERER, OF NEW YORK, N. Y.

ORTHODONTIC APPLIANCE

Application filed September 2, 1931. Serial No. 560,708.

My invention relates to orthodontic appliances and more particularly to fastening devices for orthodontia bands or expansion wires. In order to provide such a device which will be efficient for its intended purposes, it is necessary that said wires be locked against unintentional displacement by the patient and yet be readily removable by the dentist when a new adjustment of the wire is required as correction of the imperfections proceeds. Heretofore it has been attempted to secure this result in many ways, many of which, however, have been unsuccessful because the locking device has been susceptible of displacement by the patient, for instance, by manipulation of the tongue, by chewing certain substances and in other ways.

An orthodontic lock invented by me and disclosed in my Patent No. 1,487,698, March 25, 1924 is designed to overcome these disadvantages. I have found, however, in practice that the plugs and sockets shown in my said prior patent must, to perform their function properly, be made exact to within 1/5000th of an inch. The half round shapes shown in said patent therefore require careful individual manufacture with respect to each set of cooperating plug and socket elements. For efficient commercial practice, however, where thousands of such appliances are manufactured, the condition should be such as to permit any one of the posts as manufactured to fit any one of the sockets as manufactured, a requirement which could not be met by the exactness attainable in ordinary manufacturing processes, when the articles produced were shaped as shown in my prior patent. My present invention remedies the difficulty and represents an improvement over the orthodontic appliance described in my prior patent. It comprises a lock in which the tapered socket and plug, instead of having the sectional configuration of a cord and an arc, are completely circular so that a frictional contact of uniform progression is obtained and in which the exterior of the plug and the inner wall of the socket are each accurately configured to the outer peripheral surface of a frustrum of a cone of the same degree of slope, which results not only in enlarging the frictional surfaces but in permitting interchangeability between any such plug or socket with any other such plug or socket respectively with reliable assurance of such firm and perfect union between any such plug and any such socket that when assembled they become incapable of separation by manual means or by any of the effects of use but only by an instrument.

The particular feature of the present invention, therefore, is to provide an orthodontic lock which is simple in construction, easy to apply, readily removable by the operator when required, and has its parts so constructed that they are readily interchangeable. Other more specific objects will be apparent from the description hereinafter.

A specific embodiment of my invention is illustrated in the accompanying drawing, in which Fig. 1 shows the complete appliance on a natural-size model of a human lower jaw, with actual size lock and alignment wire with the lock in position; Fig. 2 shows the post of my orthodontic device; Fig. 3 shows the post with the alignment wire soldered thereto; Fig. 4 shows the socket of my device; Fig. 5 is a side view of the socket; Fig. 6 shows the socket, and the post with the alignment wire soldered thereto, in position within the socket, the latter being shown attached to the band of a tooth; Fig. 7 is a plan view of the device shown soldered to the band; Fig. 8 is a section along line 8—8 of Fig. 6; Fig. 9 shows a preferred modification of my device; Fig. 10 shows the complete lock on the alignment wire and band with a pair of pliers for locking the post within the socket; Fig. 11 shows the complete lock on the alignment wire and band with a pair of pliers for unlocking the post from the socket; and Fig. 12 shows the operative end of one of the jaws of the pliers, having locking pins protruding from both sides thereof.

Referring more particularly to the drawing, in which similar reference characters identify similar parts in the several views, the locking device comprises two members, one of which is in the form of a post or plug 12 constructed of suitable metal and of circular horizontal cross-section, tapering from the top to the bottom thereof. The other member of the lock consists of socket 13 of suitable metal corresponding in cross-sectional form to that of the plug and into which said plug is adapted to fit. The socket member 13 is of approximately circular cross-section provided with a flattened wall 14 adapted to be placed against the band 15 of the tooth as by soldering 16. The plug member 12 is of somewhat greater length than the socket 13 so as to project beyond the bottom edge of the same when inserted therein, as shown in Figs. 6 and 8.

In practice, the socket 13 is fastened to the customary metallic band 15 which encircles a suitable tooth in the dental arch, the connection being effected in any convenient manner as by soldering the flattened wall of the socket 13 in surface engagement with the band 15. The plug 12 is provided with a transverse channel 17 concaved to receive one end of the alignment wire 18, said wire being attached to the seat formed therefor by the channel 17 by soldering or otherwise, the wire preferably extending over the larger end face of the plug, as shown in Fig. 3. It will be understood that the alignment wire 18 may be of any customary form and type and, further, that plugs 12 are located at opposite ends thereof for cooperation with sockets 13, carried by bands 15 suitably positioned at opposite points of the dental arch, the wire 18 extending either along the labial part of the dental arch or the lingual part thereof, this depending upon the difficulty which is to be corrected. The wire 18 is placed in operative position by simply inserting the plugs 12 into the cooperating sockets 13 under a sufficient pressure exerted as more fully described hereinafter to firmly seat said plugs therein, this operation being facilitated by the tapering form of both plug and socket. The relatively smaller ends of the plugs are readily introduced into the relatively larger ends of the sockets and thus reduce the necessity for careful manipulation and the positioning of the parts to a minimum. The sides of the sockets 13 as shown in Fig. 4 at the upper portion thereof are edge-grooved or recessed so that the alignment wire 18, when fully seated as shown in Fig. 9, for example, cannot move laterally but is restrained from twisting the plug in the sockets, whereby twisting motions on the plug, which might develop by the strains of the wire in use, will be checked and prevented from tending to break the lock.

When the lock parts are combined with each other the inner faces of the sockets are in surface engagement throughout with correspondingly shaped faces of the plug, and because of the tapering form of the parts are securely wedged together against unintentional separation. Because of the fact that the large ends of the plugs are presented in a direction toward the active faces of the teeth, as shown in Fig. 1, any pressure on the plugs resulting from the operation of chewing by the patient will only tend to force the plugs more firmly into the sockets, thus increasing the hold thereof. At the same time if the substance being chewed is of a nature to stick to the plugs and exert a withdrawing force thereon, the relatively large surface engagement of the plugs with the sockets, being the entire outer peripheral surface of the plugs and the entire inner peripheral surface of the sockets, will create sufficient frictional resistance to neutralize such withdrawal force and thus prevent the unintentional displacement of the plugs from the sockets. Furthermore, the frictional resistance referred to will be sufficient to prevent any manipulation of the tongue of the patient from forcing the plugs out of the sockets by pressure thereon, so that the alignment wire 18 will be firmly and securely held in its intended location against any unintentional displacement or shifting. The guarding from unintentional displacement of the plug from the socket by means of the alignment wire is enhanced by positioning such alignment wire within its seat in the top of the plug so as to have its top surface substantially flush with the top surface of the plug, as shown in the preferred embodiment of my device illustrated in Fig. 9. By this construction any discomfort to the patient which might be presented by the tongue of the patient coming in contact with the portion of the expansion wire protruding from the plug 12, is avoided.

For the purpose of securely seating the plug 12 within the socket 13, I provide the latter on the side thereof opposite its flattened surface 14 engaging the surface of the band 15, with an aperture 19 into which may be inserted one of the pins 20 protruding from the lower jaw member 21 of a pair of pliers 22, the other jaw member 23 of said pliers being provided with a flattened head 24 adapted to engage the upper surface of the plug 12 and the portion of the alignment wire 18 seated therein. In clamping the plug 12 securely within the socket 13, one of the pins 20 is inserted into the aperture 19 of the socket and the flattened head 24 placed over the upper surface of the post 12, and the jaw members 21 and 23 of the pliers 22 are closed, thereby clamping the post 12 within the socket 13, as will be evident from Fig. 9.

For effecting the removal of the plug 12 from within socket 13, a pair of pliers 25, having pins 26 protruding from the end of jaw 27 thereof, and a flattened head 28 at the end of the jaw 29 thereof, is used. By inserting one of the pins 26 into the aperture 19 of the socket 13 and placing the flattened head 28 of the jaw 29 against the surface of the portion of the post 12 protruding beyond the end of the socket 13, the plug 12 may be easily and quickly removed from the socket by the operator with the assistance of the pliers 25. It will be noted that by pressing together the two handles of the pliers the jaw members 27 and 29 thereof will be moved toward each other, so that the post 12 will be pushed upwardly and out of the socket 13.

It will be noted that the present arrangement provides an efficient lock for orthodontia, which is placed in position and readily removed by the operator, which cannot be unintentionally or even intentionally displaced by the patient, and which provides elements of the lock which are interchangeable. In other words, it is not necessary in the manufacture of the elements of the lock, to make them exact to any high degree of accuracy. By reason of the tapered circular configuration of the posts and sockets the elements of the lock are made interchangeable, i. e. any post may be used with any socket of only approximately similar dimensions.

I claim:

1. In a separable two part socket and plug orthodontic appliance, one part of which is held in fixed position upon a tooth, while the other part is fixed by an alignment wire, that improvement which comprises the combination of a socket having opposite edge grooves at the upper portions thereof adapted to receive an alignment wire, said socket being open at the top and at the bottom, each of said openings in cross-section being of circular configuration and concentric but of different radial dimensions, a smooth tapered inner wall face connecting said circular openings and configured accurately to the outer peripheral surface of a frustrum of a cone, and a rigid smooth surfaced tapered plug for said socket, an alignment wire attached to the upper part of said plug in position to be engaged by the edge grooves of the socket when the plug is fully seated in the socket, said plug being circular in every cross-section where contact is made with the socket, the exterior surface of said plug being accurately configured to the outer peripheral surface of a frustrum of a cone of the same degree of slope as that of the frustrum represented by the inner wall face of the socket, horizontal sections on all lines along the length of the plug and socket where the two are in contact corresponding to two circles having the same radius.

2. An orthodontic appliance as described in claim 1 in which the socket is provided with an aperture extending through the outer wall thereof, the top and bottom surfaces of said aperture being adapted as abutments for instruments capable respectively of pressing the plug into the socket and of subsequently breaking the frictional contact between the plug and socket by forcing the plug upwardly in a direction axial to that of the plug and socket.

3. An orthodontic appliance such as described in claim 1, in which the upper surfaces of the plugs are provided with channeled recesses of a depth approximately that of the thickness of the alignment wire, the alignment wire being soldered to the plug within said recess, whereby the upper surface of the alignment wire becomes approximately flush with the upper surface of the plug, those parts of the wire adjacent to the point of attachment beween the wire and the plug being seated within the edge grooves of the socket and thereby restrained from twisting the plug in the sockets when the parts are fully seated.

JULIUS ADERER.